(12) United States Patent
Chen et al.

(10) Patent No.: US 8,774,120 B2
(45) Date of Patent: Jul. 8, 2014

(54) TECHNIQUES FOR IMPROVING CONTROL CHANNEL ACQUISITION IN A WIRELESS COMMUNICATION SYSTEM

(71) Applicant: Apple Inc., Cupertino, CA (US)

(72) Inventors: Ning Chen, Austin, TX (US); Leo Dehner, Austin, TX (US); James W. McCoy, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/730,356

(22) Filed: Dec. 28, 2012

(65) Prior Publication Data

US 2013/0182659 A1 Jul. 18, 2013

Related U.S. Application Data

(63) Continuation of application No. 11/742,255, filed on Apr. 30, 2007, now Pat. No. 8,345,655.

(51) Int. Cl.
*H04W 28/04* (2009.01)

(52) U.S. Cl.
USPC .......................................... 370/329; 370/343

(58) Field of Classification Search
USPC ........................... 370/343, 329, 208, 252, 394
See application file for complete search history.

(56) References Cited

U.S. PATENT DOCUMENTS

| | | | |
|---|---|---|---|
| 2005/0141630 A1* | 6/2005 | Catreux et al. | 375/267 |
| 2007/0086406 A1 | 4/2007 | Papasakellariou | |
| 2007/0097981 A1* | 5/2007 | Papasakellariou | 370/394 |
| 2007/0201350 A1 | 8/2007 | Papasakellariou | |
| 2008/0130480 A1 | 6/2008 | Li et al. | |
| 2008/0232240 A1 | 9/2008 | Baum et al. | |

OTHER PUBLICATIONS

E-UTRA DL L1/L2 Control Channel design (Feb. 12-16, 2007, p. 1-8, 3GPP TSG RAN1 #48, R1-070787, Motorola, St. Louis).

* cited by examiner

*Primary Examiner* — Mark Rinehart
*Assistant Examiner* — Matthew Hopkins
(74) *Attorney, Agent, or Firm* — Paradigm IP Law, PC; Ross L. Franks (57) ABSTRACT

A technique of operating a wireless communication system includes determining respective geometries of multiple subscriber stations, which include a first subscriber station and a second subscriber station, with respect to a serving base station. Respective control channels, which include a first control channel associated with the first subscriber station and a second control channel associated with the second subscriber station, for the multiple subscriber stations are then scheduled based on the respective geometries. The first control channel is scheduled to be encountered earlier in a control channel search procedure, of the one or more control channel symbols, than the second control channel. The first subscriber station has a lower geometry than the second subscriber station.

16 Claims, 5 Drawing Sheets

TECHNIQUES FOR IMPROVING CONTROL CHANNEL ACQUISITION IN A WIRELESS COMMUNICATION SYSTEM

PRIORITY

This application is a continuation of and claims priority to co-owned U.S. patent application Ser. No. 11/742,255 entitled "TECHNIQUES FOR IMPROVING CONTROL CHANNEL ACQUISITION IN A WIRELESS COMMUNICATION SYSTEM" filed Apr. 30, 2007, issuing as U.S. Pat. No. 8,345,655, the foregoing being incorporated herein by reference in its entirety.

BACKGROUND

1. Field

This disclosure relates generally to control channels and, more specifically, to techniques for improving control channel acquisition in a wireless communication system.

2. Related Art

In general, orthogonal frequency division multiplexing (OFDM) systems support high data rate wireless transmission using orthogonal channels, which offer immunity against fading and inter-symbol interference (ISI) without requiring implementation of elaborate equalization techniques. Typically, OFDM systems split data into N streams, which are independently modulated on parallel spaced sub-carrier frequencies or tones. The frequency separation between subcarriers is 1/T, where T is the OFDM symbol time duration. Each symbol may include a guard interval (or cyclic prefix) to maintain the orthogonality of the symbols. In general, OFDM systems have utilized an inverse discrete Fourier transform (IDFT) to generate a sampled (or discrete) composite time-domain signal.

Wireless networks have generally used an estimated received signal strength and an estimated carrier to interference and noise ratio (CINR) of a received signal to determine operational characteristics of the networks. As one example, IEEE 802.16e compliant mobile stations (MSs) are required to estimate a received signal strength indicator (RSSI) and a CINR of a received signal. The RSSI associated with a serving BS may be used by an MS for cell re-selection and the CINR, which is reported to the serving BS, may be used by the serving BS to adapt a downlink transmission rate to link conditions.

Accurate reported CINRs are desirable, as inaccurate reported CINRs may impact performance of a wireless network. For example, reporting a CINR that is above an actual CINR may decrease network throughput due to frame re-transmission, while reporting a CINR that is below the actual CINR may cause the serving BS to schedule data rates below a supportable data rate. According to IEEE 802.16e, RSSI and CINR estimates at an MS are derived based on a preamble signal, which is an orthogonal frequency division multiple access (OFDMA) symbol that is transmitted at the beginning of each OFDMA frame.

Similarly, wireless networks that employ third-generation partnership project-long term evolution (3GPP-LTE) compliant architectures are required to employ uplink reference signals (RSs) for uplink CINR estimation, which is used by the network to schedule uplink transmission for user equipment (subscriber stations (SSs)). Respective sequences of the RSs are used to uniquely identify an SS and, when transmitted from the SS to a serving base station (BS), may be used by the serving BS in channel characterization. In general, a scheduler associated with one or more serving BSs utilizes information derived from channel characterization to determine channel allocation for the SSs. The channel allocation, e.g., uplink and downlink assignments, have then been provided to the SSs over a downlink shared control channel, which typically includes one or more control channel symbols. The one or more control channel symbols may be transmitted by the serving BS at a beginning of a downlink frame (or subframe). Typically, upon receiving the one or more control channels symbols, each of the SSs searches the one or more control channel symbols to determine an associated uplink and downlink assignment. Known control channel scheduling approaches have proposed scheduling control channels irrespective of an SSs geometry with respect to a serving BS. Unfortunately, low-geometry SSs (e.g., cell-edge SSs operating at or near an edge of a cell) may receive a relatively weak signal from the serving BS and, thus, may experience a relatively high error rate in detecting associated control channels. Moreover, low-geometry SSs may also experience a relatively high latency in detecting associated control channels.

What is needed are techniques for improving control channel acquisition in a wireless communication system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a subscriber station, such as a cellular handset, it will be appreciated that the present invention is not so limited and may be embodied in various wireless devices, e.g., personal digital assistants (PDAs), digital cameras, portable storage devices, audio players, computer systems, and portable gaming devices, for example.

As is used herein, the term "user equipment" is synonymous with the term "subscriber station," which is used to broadly denote a wireless device associated with a wireless communication system. As is also used herein, the term "control channel symbol" includes a symbol that occupies a channel, which may occupy an entire system bandwidth or a portion of the entire system bandwidth. The "channel," as used herein, includes one or more subcarriers, which may or may not be adjacent. As used herein, the term "slot" refers to a symbol location in a multiple access signal. The term "blind search procedure" is used herein to refer to a search procedure in which the searcher, e.g., an SS, has no prior knowledge of a location of an item searched for in a sequence of items. For example, when an SS is searching one or more channel symbols for an associated control channel, the SS does not have prior knowledge of the location of the associated control channel in the one or more control channel symbols when a blind search procedure is employed.

According to various aspects of the present disclosure, a control channel scheduling technique is employed that generally reduces latency and error rate associated with the detection of a control channel by a low-geometry subscriber station (SS). A geometry of an SS with respect to a serving base station (BS) may be indicated by, for example, a carrier-to-interference and noise ratio (CINR) associated with the SS. For example, a cell-edge SS may have a relatively low associated CINR at a serving BS and, thus, be classified as a low-geometry SS. In general, a low-geometry SS control channel is scheduled in one or more control channel symbols (transmitted from a serving BS on a common control channel) such that the low-geometry SS control channel may be detected earlier in a control channel search procedure employed by the low-geometry SS. For example, when a low-geometry SS employs a blind search procedure that starts at a beginning of the one or more control channel symbols and sequentially searches through the control channel symbols until the low-geometry SS finds an associated control channel, the low-geometry SS control channel should be scheduled toward the beginning of the one or more control channel symbols. It should, however, be appreciated that the techniques disclosed herein are equally applicable to search routines that do not sequentially search one or more control channel symbols from beginning to end.

According to one embodiment of the present disclosure, a method of operating a wireless communication system includes determining respective geometries of multiple subscriber stations (SSs), which include a first SS and a second SS, with respect to a serving base station (BS). Respective control channels for the multiple SSs are then scheduled based on the respective geometries. The respective control channels include a first control channel (associated with the first SS) and a second control channel (associated with the second SS). The first control channel is scheduled to be encountered earlier in a control channel search procedure (of one or more control channel symbols) than the second control channel. In this embodiment, the first SS has a lower geometry than the second SS. Thus, in a typical case, a low-geometry SS should detect an associated control channel relatively early in a control channel search procedure. This generally reduces the latency associated with a low-geometry SS detecting an assigned control channel and reduces the probability of the low-geometry SS detecting a wrong control channel as an assigned control channel (which is commonly referred to as false positive probability). In at least one embodiment, the first control channel is scheduled in a first control channel symbol (included within the one or more control channel symbols) of a downlink frame or sub frame.

According to another embodiment of the present disclosure, a method of operating a wireless communication system includes receiving, at a first subscriber station (SS) a first control channel associated with the first SS and a second control channel associated with a second SS. One or more control channel symbols are searched by the first SS for the first control channel, which is scheduled such that the first control channel is encountered earlier in a control channel search procedure of one or more control channel symbols than the second control channel. In this embodiment, the first SS has a lower geometry than the second SS.

According to another aspect of the present disclosure, a wireless communication system includes a base station (BS) and a scheduler. The BS is configured to determine respective geometries of multiple subscriber stations (SSs) with respect to the BS. The multiple SSs include a first SS and a second SS. The scheduler is configured to schedule respective control channels for the multiple SSs based on the respective geometries of the multiple SSs. The respective control channels include a first control channel associated with the first SS and a second control channel associated with the second SS. The first control channel is scheduled to be encountered earlier in a control channel search procedure of one or more control channel symbols than the second control channel. According to this aspect of the present disclosure, the first SS has a lower geometry than the second SS.

Figure 1:
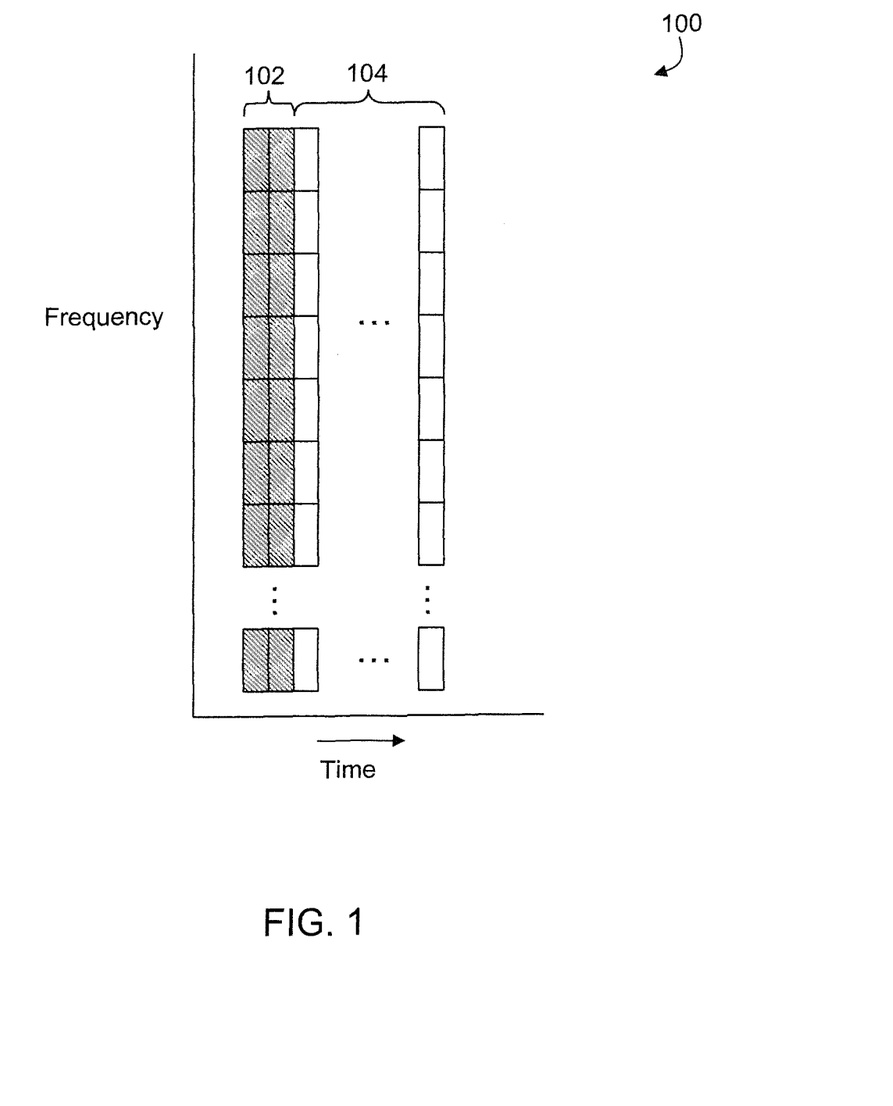
FIG. 1 is an example diagram of a downlink (DL) subframe, including two control channel symbols, that may be transmitted from a serving base station (BS) to multiple subscriber stations.

With reference to FIG. 1, an example downlink (DL) subframe 100 is illustrated that includes two control channels symbols 102 and multiple data symbols 104. The control channel symbols 102 include a number of control channel elements (CEs) each of which include a number of subcarriers, e.g., six subcarriers. Similarly the data symbols 104 each include a number of resource blocks (RBs), e.g., twelve subcarriers. It should be appreciated that the CEs and the RBs may have the same size or a different size. It should also be appreciated that the techniques disclosed herein are broadly applicable to DL subframes of varying sizes and that a control channel symbol may assume an integer value (e.g., 1, 2, 3, etc. symbols) or a fractional value (e.g., 1.5, 2.5, etc. symbols). Transmitters implemented within a wireless communication system, configured according to various embodiments of the present disclosure, may transmit information using a phase shift keying (PSK), a quadrature amplitude modulation (QAM), or other data modulation scheme, depending upon which modulation scheme is scheduled. For example, any of the various PSK (such as pi/2 BPSK, QPSK, and 8-PSK), or QAM (such as 16-QAM and 64-QAM) modulation techniques may be implemented.

According to various aspects of the present disclosure, respective control channels for subscriber stations (SSs) are scheduled in one or more control channel symbols, based upon respective geometries of the SSs with respect to a serving base station (BS). For example, a control channel for a high-geometry SS (e.g., an SS with a CINR of about 15 dB) is scheduled to be encountered later in a control channel search procedure than a control channel for a low-geometry SS (e.g., an SS with a CINR of about 0 dB) that uses, for example, the same number of control channel elements (CEs). Moreover, a control channel for a medium-geometry SS (e.g., an SS with a CINR of about 7.5 dB) may be scheduled to be encountered earlier in a control channel search procedure than a control channel for a high-geometry SS that uses, for example, the same number of control channel elements (CEs), and may be scheduled to be encountered later in a control channel search procedure than a control channel for a low-geometry SS that uses, for example, the same number of CEs. It should be appreciated that the CINRs, set forth above, are example CINRs and that the detection may be based upon the number of CEs used in a control channel search procedure, or other criteria. For example, control channels may be scheduled irrespective of the number of the number of CEs in a control channel.

In the disclosed approach, the serving BS initially calculates a CINR of a training signal transmitted from a given SS, during a training sequence, and compares the calculated CINR to one or more thresholds to determine a geometry of the given SS. The training signal may be, for example, a random access preamble or a channel sounding burst. In the event that a given SS is determined to be a low-geometry SS, a control channel for the given SS is assigned, by a scheduler, e.g., a network scheduler, such that the given SS encounters the control channel scheduled for the given SS relatively early in a control channel search procedure of one or more control channel symbols. In the event that a given SS is later detected to be at a higher geometry, the scheduler may adjust the placement of later control channels for the given SS such that the given SS encounters the later control channels for the given SS later in the control channel search procedure.

Figure 2:
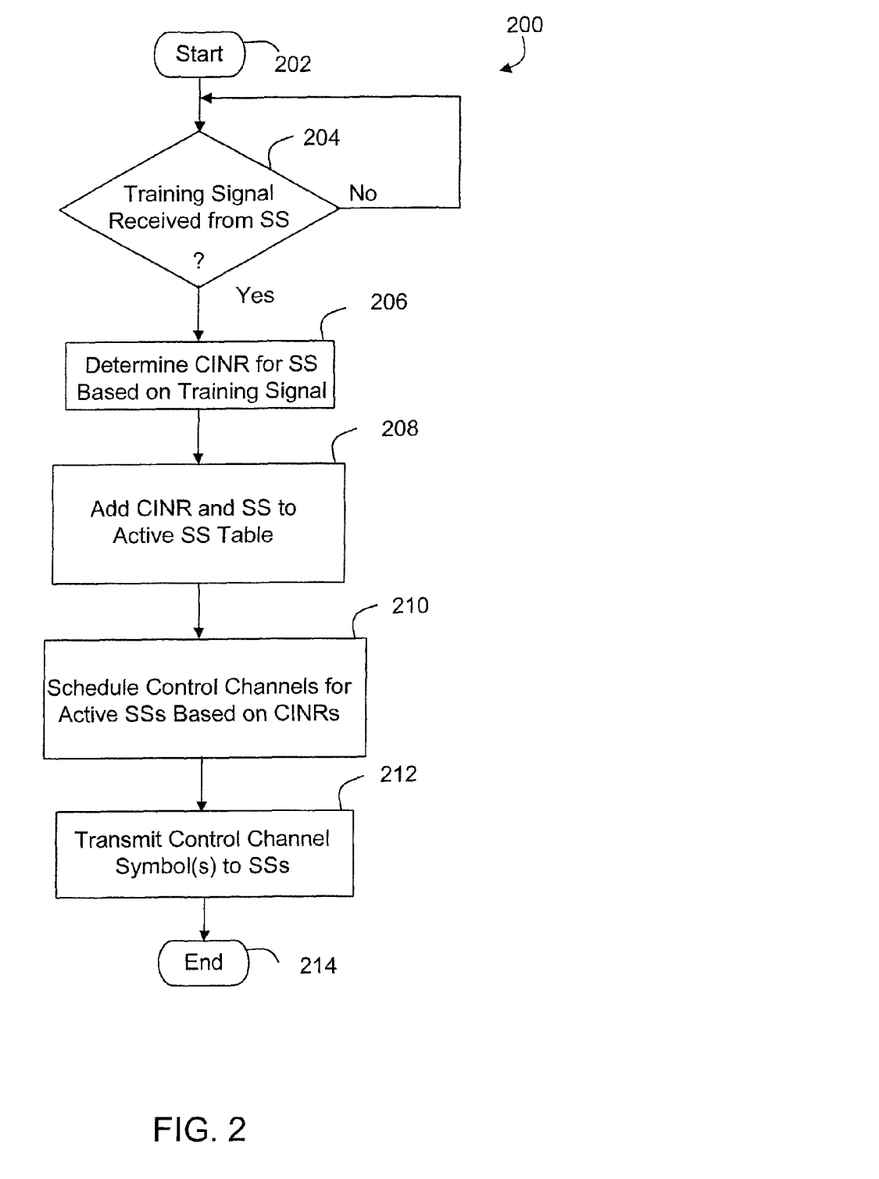
FIG. 2 is a flowchart of a control channel scheduling process that may be, at least partially, employed in a scheduler in a wireless communication system, according to the present disclosure.

Turning to FIG. 2, a control channel scheduling process 200, that may be, at least partially, employed in a scheduler (such as a network-based scheduler) in a wireless communication system, is depicted. The process 200 is initiated at block 202, at which point control transfers to decision block 204. In block 204, a serving base station (BS) determines whether a training signal has been received from a subscriber station (SS). If a training signal is received in block 204, control transfers to block 206, where a CINR for the SS is determined based on the training signal. If a training signal is not received in block 204, control loops on block 204 until a training signal is received. Following block 206, control transfers to block 208, where the SS and an associated CINR of the SS are added to an active SS table (e.g., a memory). In this manner, a geometry associated with a given SS may be taken into account when control channel symbols are being constructed. Next, in block 210, a scheduler utilizes the information included in the table to schedule control channels for active SSs in one or more control channel symbols. It should be appreciated that information for active SSs would typically be periodically updated and that information for inactive SSs would typically be periodically removed from the table. Following block 210, control transfers to block 212, where the serving BS transmits the control channel symbol(s) to the active SSs. Next, control transfers from block 212 to block 214, where control returns to a calling routine.

A CINR of a received signal may be estimated through a number of approaches. As a first example, U.S. Patent Application Publication No. 2006/0133260 discloses a channel estimation based approach for estimating CINR that isolates noise and interference components using pilot sequences and estimates a channel power by subtracting a combined noise and interference power estimate from a received power estimate. As a second example, U.S. Patent Application Publication No. 2006/0093074 discloses a difference based approach for estimating CINR that assumes that adjacent pilot locations have the same subchannel characteristics. In view of this assumption, noise and interference components are isolated by subtracting adjacent received signals.

Figure 3:
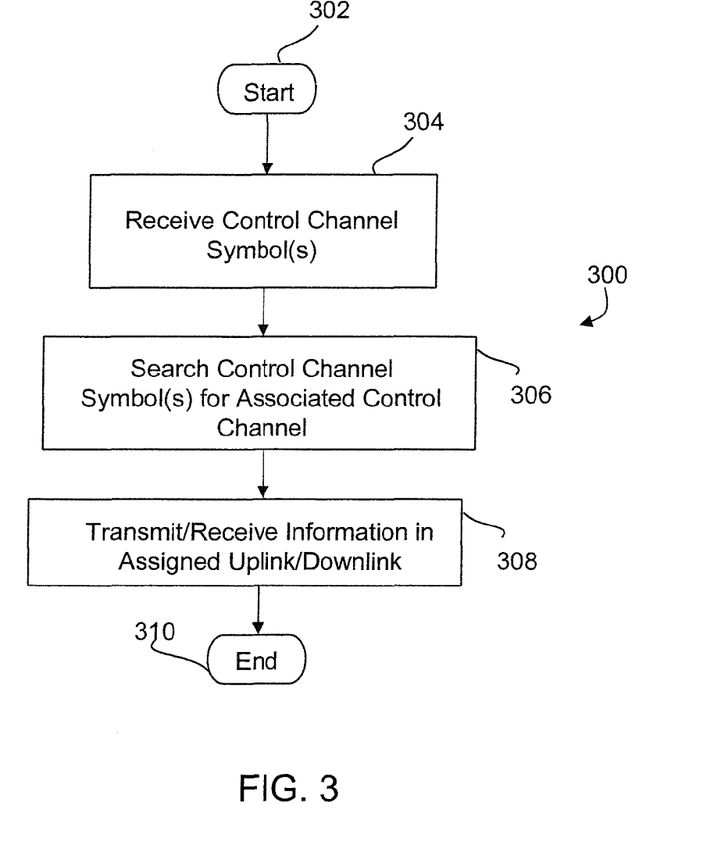
FIG. 3 is a flowchart of a process for receiving one or more control channel symbols and searching the one or more control channel symbols for an associated control channel at a given subscriber station (SS) in a wireless communication system, according to the present disclosure.

Moving to FIG. 3, a process 300, for receiving one or more control channel symbols at a given SS and searching for an associated control channel for the given SS, is illustrated. In block 302, the process 300 is initiated, at which point control transfers to block 304. In block 304, one or more control channels symbols are received at an SS. The control channel symbols may be, for example, orthogonal frequency multiplexing (OFDM) signals. Next, in block 306, the SS searches the control channel symbols for an associated control channel, which may include one or more control channel elements (CEs). The associated control channel may be a downlink control channel, an uplink control channel, or a combined control channel that includes both uplink and downlink assignment information. Then, in block 308, information is either transmitted by the SS in an assigned uplink or information is received by the SS in an assigned downlink. Typically, the assigned uplink (provided in an uplink control channel) includes an uplink subcarrier assignment and an uplink slot assignment and the assigned downlink (included in a downlink control channel) includes a downlink subcarrier assignment and a downlink slot assignment. Following block 308, control transfers to block 310, where control returns to a calling routine. In general, scheduling low-geometry SSs to encounter an associated control channel earlier in a control channel search procedure decreases the probability of low-geometry SSs detecting a wrong control channel and decreases a time period required for the low-geometry SS to locate an associated control channel. This is particularly advantageous for cell-edge SSs which frequently receive weaker signals and experience higher interference (from, for example, non-serving BSs in neighboring cells).

Figure 4:
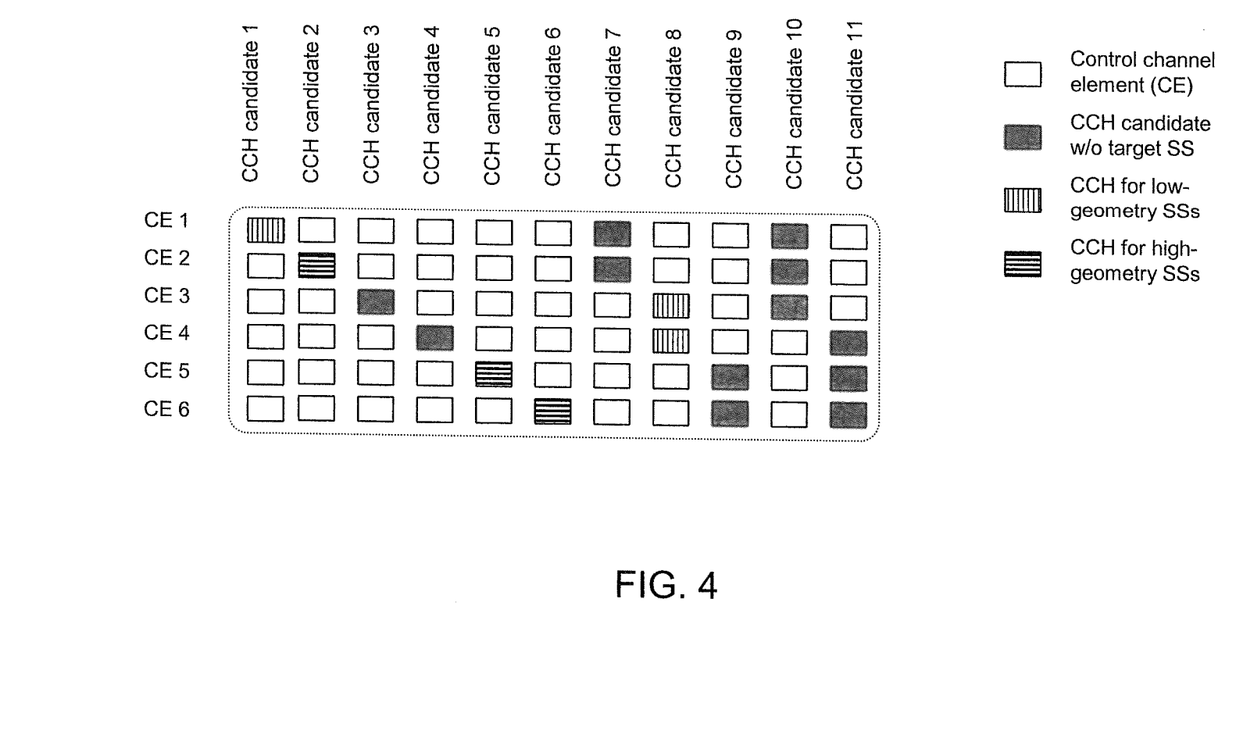
FIG. 4 is an example diagram of a control channel search procedure for detecting a control channel associated with an SS in a wireless communication system.

Turning to FIG. 4, a chart of an example control channel search procedure, for detecting a control channel associated with an SS in a wireless communication system, is depicted. In the illustrated control channel search procedure, an SS first searches single CEs (i.e., each of CE1-CE6) for an associated control channel. Assuming that the SS does not find the associated control channel in a single CE, the SS searches two CEs (i.e., CE1/CE2, CE3/CE4, and CE5/CE6) for the associated control channel. Similarly, assuming that the SS does not find the associated control channel in two CEs, the SS searches three CEs (i.e., CE 1/CE2/CE3 and CE4/CE5/CE6) for the associated control channel. It should be appreciated that any number of different control channel search procedures may be employed by an SS. For example, a control channel search procedure may search for a control channel for a given SS by first searching a first CE of a control channel symbol for an associated control channel, then the first two CEs (i.e., the first CE and a second CE) of the control channel symbol and then the first three CEs (i.e., the first and second CEs and a third CE) of the control channel symbol. Assuming that the given SS does not find an associated control channel, the search procedure may search the second CE, then the second and third CEs and finally the second and third CEs and a fourth CE. In FIG. 4, a control channel (CCH) for a low-geometry SS that includes a single CE is scheduled to be located at CCH candidate 1. As is also illustrated, control channels for high-geometry SSs that include a single CE are scheduled at CCH candidate 2, CCH candidate 5, and CCH candidate 6, which are later than CCH candidate I. A control channel for a low-geometry SS that includes two CEs is scheduled to be located at CCH candidate 8, which, while being located after single CEs in control channel search procedure, is located prior to any higher geometry SSs (in this case zero) control channels that require two CEs in the control channel search procedure.

As noted above, scheduling low-geometry SSs to encounter an associated control channel earlier in a control channel search procedure usually decreases the probability of low-geometry SSs detecting a wrong control channel and usually decreases a search time period required for the low-geometry SSs to find an associated control channel. As is also noted above, this is particularly advantageous for cell-edge SSs which frequently receive weaker signals and frequently experience higher interference from non-serving BSs in neighboring cells. It should be appreciated the control channel search procedure illustrated in FIG. 4 may be applied to control channel symbols including more or less than six CEs. Furthermore, it should be appreciated that the techniques disclosed herein are broadly applicable to other control channel search procedures.

Figure 5:
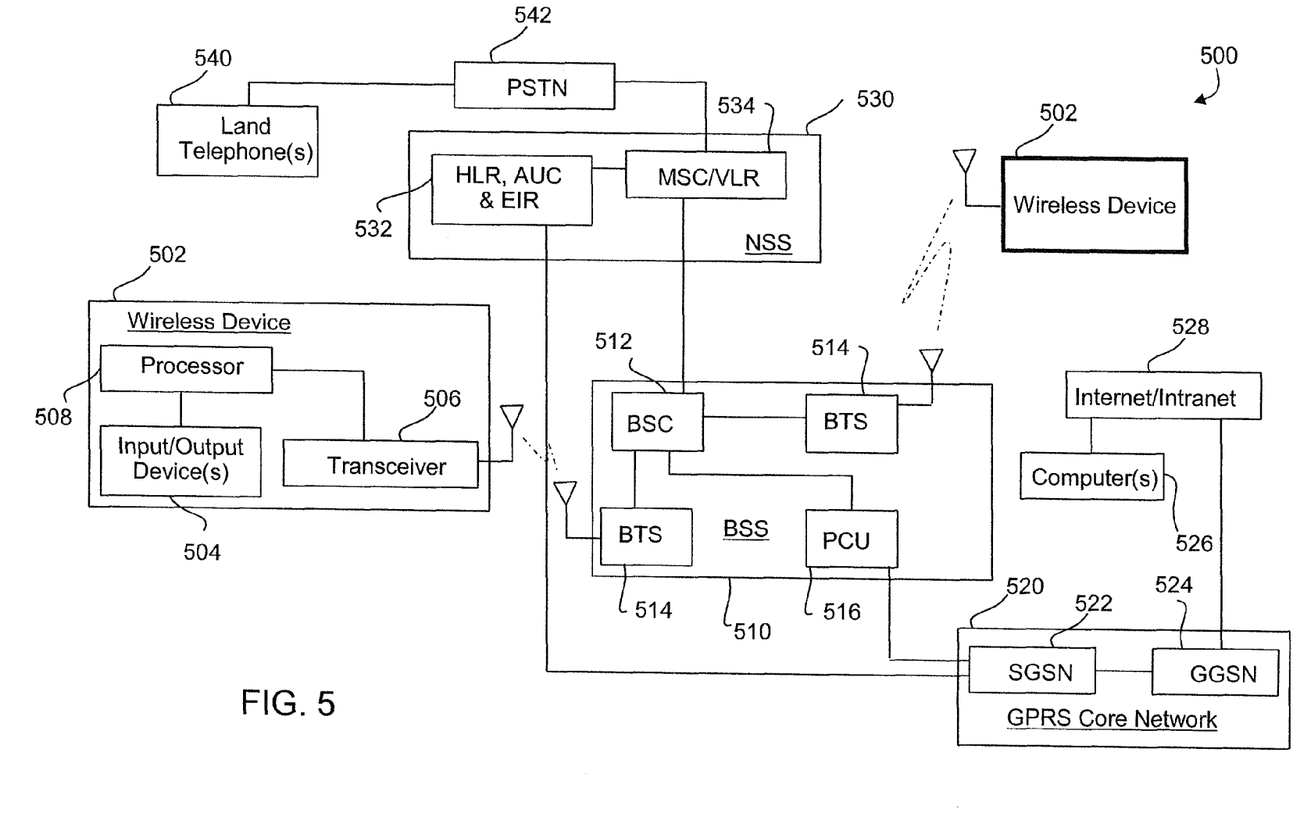
FIG. 5 is a block diagram of an example wireless communication system that may schedule control channels for SSs according to various embodiments of the present disclosure.

With reference to FIG. 5, an example wireless communication system 500 is depicted that includes a plurality of wireless devices (subscriber stations) 502, e.g., hand-held computers, personal digital assistants (PDAs), cellular telephones, etc., that may implement scheduling of control channels within a control channel symbol according to one or more embodiments of the present disclosure. In general, the wireless devices 502 include a processor 508 (e.g., a digital signal processor (DSP)), a transceiver 506, and one or more input/output devices 504 (e.g., a camera, a keypad, display, etc.), among other components not shown in FIG. 5. As is noted above, according to various embodiments of the present disclosure, techniques are disclosed that facilitate improved control channel acquisition for a wireless communication device, such as the wireless devices 502. The wireless devices 502 communicate with a base station controller (BSC) 512 of a base station subsystem (BSS) 510, via one or more base transceiver stations (BTS) 514, to receive or transmit voice, data, or both voice and data. The BSC 512 may, for example, be configured to schedule communications for the wireless devices 502. Alternatively, the BTS 514 may schedule communications for the wireless devices 502 in which the BTS 514 is in communication.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the wireless devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSCNLR) 534, which is in communication with a home location register (HLR), an authentication center (AUC), and an equipment identity register (EIR) 532. In a typical implementation, the MSCNLR 534 and the HLR, AUC, and EIR 532 are located within a network and switching subsystem (NSS) 530, which may also perform scheduling for the system 500. The SGSN 522 may communicate directly with the HLR, AUC and EIR 532. As is also shown, the MSCNLR 534 is in communication with a public switched telephone network (PSTN) 542, which facilitates communication between wireless devices 502 and land telephones 540. It should be appreciated that other types of wireless systems, having different configurations, may implement various aspects of the control channel scheduling techniques disclosed herein.

Accordingly, a number of techniques have been disclosed herein that generally improve control channel acquisition by subscriber stations in a wireless communication system.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. For example, the control channel scheduling techniques disclosed herein are generally broadly applicable to wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a subscriber station in a wireless communication system, comprising:
   receiving one or more control channel symbols of a plurality of control channel symbols, the one or more control channel symbols including a control channel associated with a particular subscriber station of one or more subscriber stations; and
   searching the one or more control channel symbols for the control channel that is associated with the particular subscriber station, where the control channel is scheduled in the plurality of control channel symbols based at least in part on respective geometries of the one or more subscribers stations,
   wherein the control channel is further scheduled in the plurality of control channel symbols based at least in part on a number of control channel elements assigned to the subscriber station.

2. The method of claim 1, where a plurality of control channels are scheduled in the plurality of control channel symbols such that subscriber stations with lower respective geometries are associated with earlier scheduled control channels, and subscriber stations with higher respective geometries are associated with later scheduled control channels.

3. The method of claim 1, where the respective geometries of the one or more subscriber stations are based at least in part on a determined carrier-to-interference-and-noise-ratio (CINR) of each subscriber station with respect to a serving base station.

4. The method of claim 1, wherein the control channel is further scheduled in the plurality of control channel symbols based at least in part on a total number of control channel elements assigned to the one or more subscriber stations.

5. A subscriber station device, comprising:
a processor;
one or more wireless interfaces in data communication with the processor; and
a computer readable apparatus in data communication with the processor and having a non-transitory storage medium with at least one computer program stored thereon, the at least one computer program configured to, when executed, cause the subscriber station device to:
receive a plurality of control channel elements from a serving base station, the one or more control channels scheduled in the plurality of control channel elements based at least on the respective geometries of one or more subscriber stations with respect to the serving base station;
search at least one of the plurality of control channel elements for a control channel scheduled for the subscriber station device, where the one or more control channels are further configured to be scheduled in the one or more control channel elements based at least in part on a number of control channel elements assigned to respective subscriber stations; and
when no control channel scheduled for the subscriber station device is found via the search, increase a number of control channel elements searched.

6. The subscriber station device of claim 5, where subscriber stations with lower geometries are scheduled in time earlier than subscriber stations with higher geometries.

7. The subscriber station device of claim 5, wherein each control channel is configured to indicate one of: (i) an uplink control channel, (ii) a downlink control channel, or (iii) both the uplink control channel and the downlink control channel.

8. A computer-readable apparatus comprising a non-transitory computer medium configured to store a plurality of instructions, the plurality of instructions configured to, when executed, cause a subscriber station to:
receive one or more control channel symbols over a control channel; and
examine at least one control channel symbol of the one or more control channel symbols for a control channel scheduled for the subscriber station;
wherein:
control channels are scheduled in the one or more control channel symbols based on a respective geometry of the subscriber station with an associated serving base station, and
the control channels are further scheduled based at least in part on a number of control channel elements assigned to a respective one of the one or more subscriber stations.

9. A method of operating a wireless communication system, the method comprising:
determining respective geometries of one or more subscriber stations associated with a serving base station; and
scheduling control channels for the one or more subscriber stations in a plurality of control channel symbols, where the control channels are scheduled within the plurality of control channel symbols based at least in part on the determined respective geometries of the one or more subscriber stations;
wherein the control channels are further scheduled based at least in part on a number of control channel elements assigned to a respective one of the one or more subscriber stations.

10. The method of claim 9, where subscriber stations with lower respective geometries are scheduled earlier in time in the plurality of control channel symbols compared to subscriber stations with higher respective geometries.

11. The method of claim 9, further comprising:
detecting a change in the respective geometries of the one or more subscriber stations; and
based at least in part on the detection, adjusting the scheduling of the control channels.

12. The method of claim 9, where the control channels indicate a corresponding one selected from the group consisting of: (i) an uplink control channel, (ii) a downlink control channel, and (iii) both the uplink control channel and the downlink control channel.

13. A base station apparatus, comprising:
a wireless interface configured to communicate with multiple subscriber stations;
a processor in data communication with the wireless interface; and
a computer readable apparatus in data communication with the processor and having a non-transitory storage medium with at least one computer program stored thereon, the at least one computer program configured to, when executed, cause the base station apparatus to:
determine respective geometries of one or more subscriber stations; and
schedule control channels for the one or more subscriber stations in a plurality of control symbols based at least in part on the determined respective geometries,
wherein the control channels are further scheduled based at least in part on a number of control channel elements assigned to a respective subscriber station.

14. The base station apparatus of claim 13, where subscriber stations with lower respective geometries are scheduled with earlier control channel symbols compared to subscriber stations with higher respective geometries.

15. The base station apparatus of claim 13, wherein the at least one computer program is further configured to, when executed, cause the base station apparatus to transmit the plurality of control symbols over a shared control channel.

16. A computer-readable apparatus comprising a non-transitory computer medium configured to store a plurality of instructions, the plurality of instructions configured to, when executed, cause a base station to:
obtain respective geometries of one or more subscriber stations; and
schedule control channels for the one or more subscriber stations in a plurality of control channel symbols in an order that is based at least in part on the respective determined geometries of the one or more subscriber stations, wherein the control channels are further scheduled based at least in part on a number of control channel elements assigned to a respective subscriber station.

\* \* \* \* \*